(No Model.)
G. CARTER.
DRAFT ATTACHMENT FOR WHEELED VEHICLES.
No. 337,376. Patented Mar. 9, 1886.
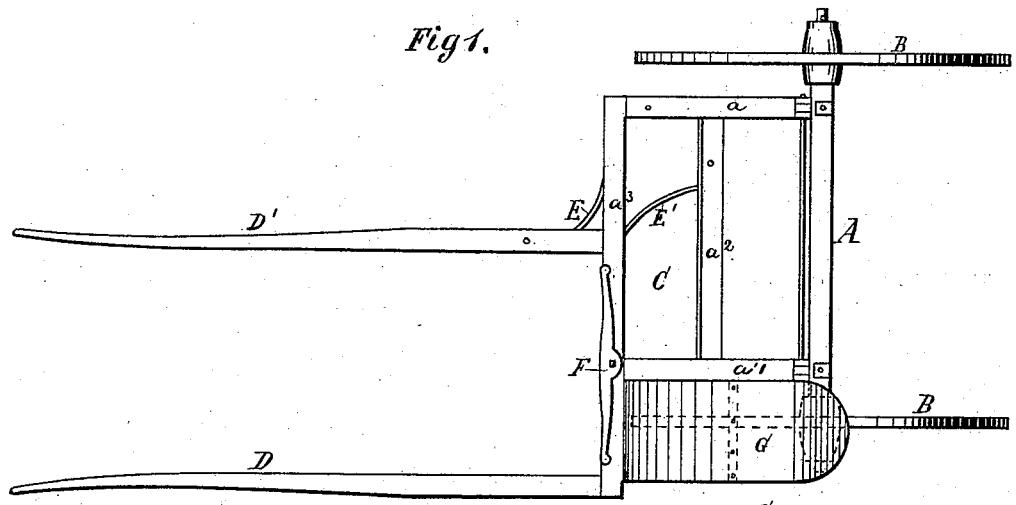
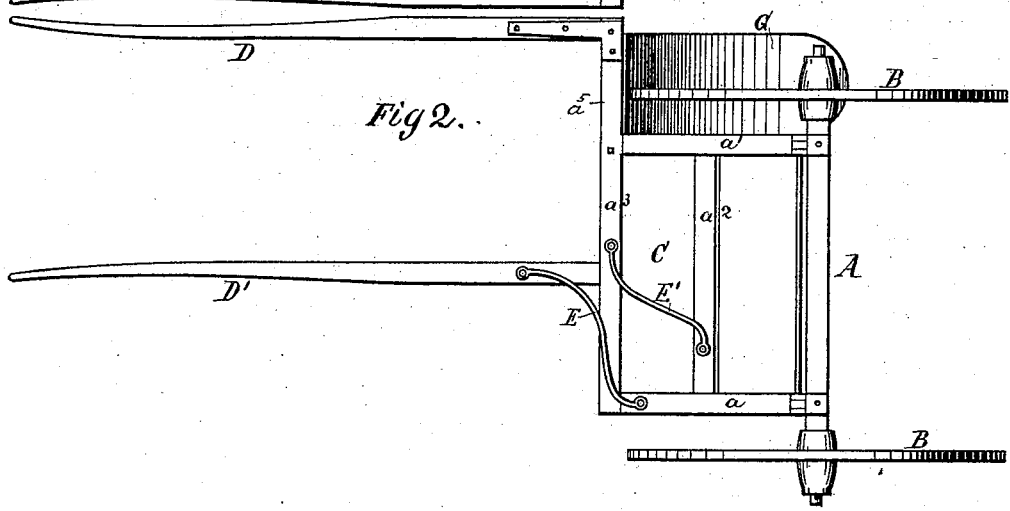
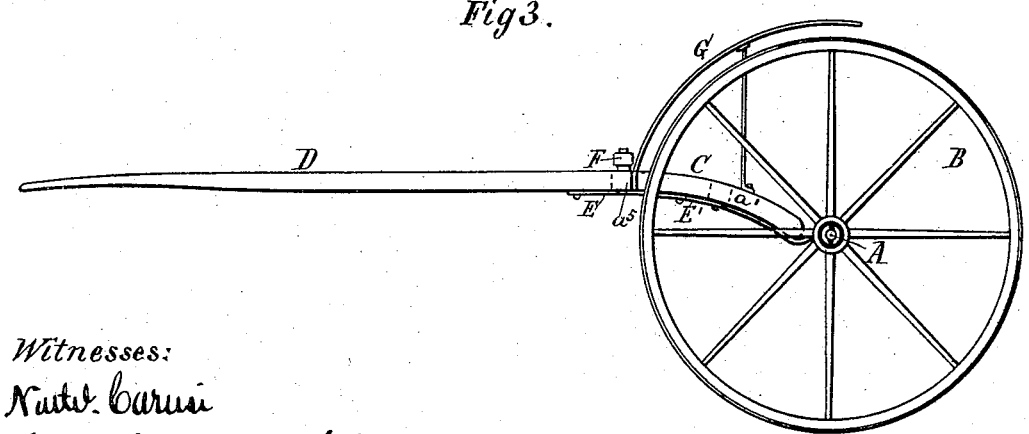
Witnesses:
Inventor:
George Carter

UNITED STATES PATENT OFFICE.

GEORGE CARTER, OF LEMARS, IOWA.

DRAFT ATTACHMENT FOR WHEELED VEHICLES.

SPECIFICATION forming part of Letters Patent No. 337,376, dated March 9, 1886.

Application filed November 2, 1885. Serial No. 181,572. (No model.)

*To all whom it may concern:*

Be it known that I, GEORGE CARTER, a citizen of the United States, residing at the city of Lemars, in the county of Plymouth and State of Iowa, have invented certain new and useful Improvements in Buggies and other Wheeled Vehicles; and I do hereby declare the following to be a full, clear, and exact description of the invention, such as will enable others skilled in the art to which it appertains to make and use the same.

My invention consists, first, in a novel shaft-hanger frame for a buggy or other wheeled vehicle, said shaft-hanger frame comprising two side hanger-bars and two transverse bars for connecting the hanger-bars, the forward one of which is extended laterally on one side of the buggy or other vehicle in front of the wheels, and said front bar having the shafts and single-tree applied to it in such a manner that the horse, when hitched to the vehicle, is permitted to travel on a level track on one side of the usual ridge of wagon-roads and in line with the wheels on one side of the vehicle, while all of the wheels of the vehicle are allowed to travel, as usual, in the tracks of such wagon-road, which road, on account of its being ridged at the center or dished or worn at the tracks of the wheels, greatly interferes with the travel of a horse if he is hitched centrally in front of the buggy or other vehicle in the usual manner.

It also consists in a novel mode of bracing said shaft-hanger frame and the shafts against extra side-draft, and of applying a dirt-fender upon the extension of the front cross-bar between the horse and one of the front wheels of the buggy or other vehicle.

In the drawings, Figure 1 is a top view of the front axle and wheels of a buggy and my invention applied thereto. Fig. 2 is an inverted plan view of the same, and Fig. 3 is a side elevation.

A in the drawings represents the front axle, and B the wheels, of a buggy. C is the shaft-hanger frame, consisting of side hanger-bars, $a$ $a'$, and rear and front connecting transverse bars, $a^2$ $a^3$. The front transverse bar, $a^3$, is of greater length than the rear one, and the additional length of this bar is made by extending the bar beyond the left-hand hanger-bar, as indicated at $a^5$. The extended portion $a^5$ lies in front of the wheels on the left-hand side of the buggy, and is terminated some distance beyond said wheels on said side of the buggy or vehicle. The frame C is strapped and hinged to the axle in the usual manner, as shown, and upon its front bar, $a^3$, the shafts D D' are firmly secured by suitable bolts and irons, the shaft D being fastened to the extreme left end of the bar, and the other, D', at a point about midway between the side hanger-bars, as shown.

In order to prevent the shaft D' and the frame from being strained apart by undue side-draft, a curved or diagonal brace, E, is applied between the right-hand hanger-bar, $a$, and the right-hand shaft, D', and another similar brace, E', between the front transverse bar, $a^3$, and the rear bar, $a^2$, in the manner shown in the drawings. These braces tie the parts firmly together and resist any undue pulling and thrusting strains. Between the shafts a swingle-bar, F, is pivoted upon the front transverse bar, $a^3$, and the horse is attached to its ends, as usual.

On the extended portion $a^5$ a curved dirt-fender, G, is applied, as shown, being bolted to said extension and sustained by a vertical standard rising from the hanger-bar $a'$. This fender prevents mud, sand, or dirt from being thrown by the wheels upon the horse drawing the buggy or vehicle.

My improvement is very greatly required on vehicles which are used on country roads and in localities where it is desirable to have the horse walk on a level side track while the wheels of the vehicle travel on either side of the usual ridged or irregular road.

What I claim is—

1. The combination of the side hanger-bars, $a$ $a'$, short rear connecting-bar, $a^2$, long front connecting-bar, $a^3$, having side extended portion, $a^5$, shafts D D', one attached between the hanger-bars and the other to the extended part $a^5$, and the braces E and E', one applied between the right-hand hanger-bar, $a$, and right-hand shaft, and the other between the front bar, $a^3$, and the rear bar, $a^2$, substantially as and for the purpose described.

2. The combination, with the shafts and hanger-frame and a wheel of a vehicle, of the fender G, attached to the extension $a^5$ and sustained by a standard of a side hanger-bar, substantially as described.

In testimony whereof I affix my signature in presence of two witnesses.

GEORGE CARTER.

Witnesses:
   GEO. N. McLAIN,
   F. E. DAVIS.